Figure 1:
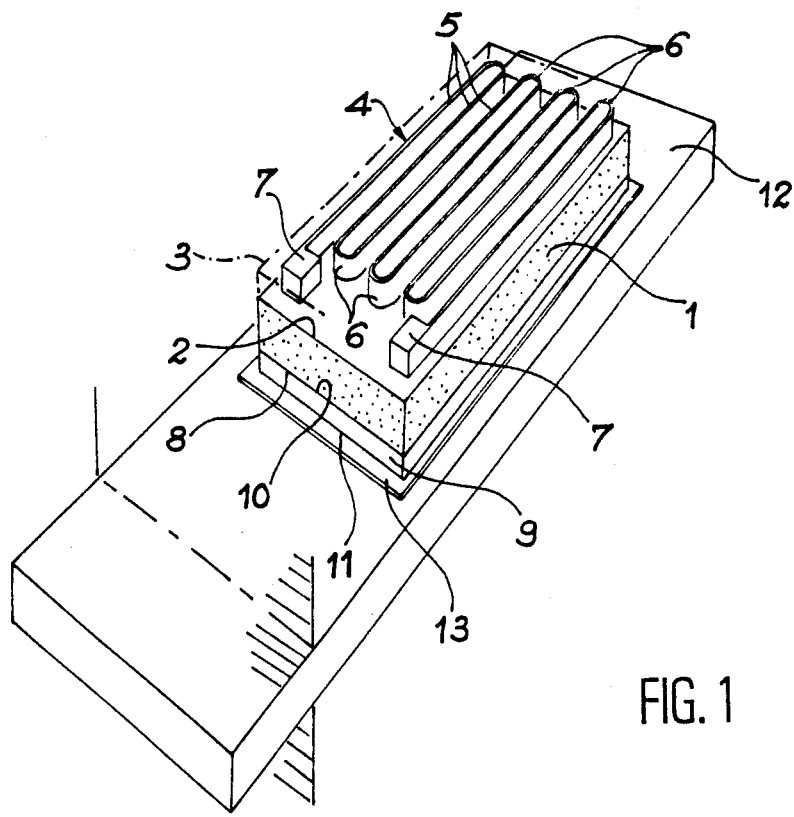

United States Patent [19]
Destannes

[11] Patent Number: 4,939,496
[45] Date of Patent: Jul. 3, 1990

[54] REGULATABLE CREEP STRAIN GAUGES AND PROCESS FOR OBTAINING SUCH GAUGES

[75] Inventor: Louis Destannes, Jarrie, France

[73] Assignee: Commissariat a l'Energie Atomique, Paris, France

[21] Appl. No.: 257,701

[22] Filed: Oct. 13, 1988

[30] Foreign Application Priority Data

Oct. 15, 1987 [FR] France .................. 87 14249

[51] Int. Cl.⁵ ............................................ G01L 1/22
[52] U.S. Cl. ............................................ 338/2; 338/5
[58] Field of Search ....................... 338/2–5; 29/621.1

[56] References Cited

U.S. PATENT DOCUMENTS

| | | | |
|---|---|---|---|
| 3,863,192 | 1/1975 | Grey | 338/2 |
| 3,905,005 | 9/1975 | Hutchins, IV. | 338/2 |
| 4,319,397 | 3/1982 | Tanabe et al. | 338/2 X |
| 4,545,255 | 10/1985 | Pugnaire | 338/4 X |
| 4,630,491 | 11/1986 | Kitagawa | 73/862.67 |
| 4,633,212 | 12/1986 | Johnson | 338/2 |
| 4,777,826 | 10/1988 | Rud, Jr. et al. | 338/4 X |

FOREIGN PATENT DOCUMENTS 0087665 7/1983 European Pat. Off. .

OTHER PUBLICATIONS

Technisches Messen, vol. 50, No. 12, Dec., 1983, pp. 455–460, "Sensoren mit Folien–und Dunnfilm–Dehnungsmesstreifen".

Primary Examiner—Bruce A. Reynolds
Assistant Examiner—Marvin M. Lateef
Attorney, Agent, or Firm—Michael N. Meller

[57] ABSTRACT

A strain gauge for compensating the creep of a support and a process for obtaining a strain gauge. The gauge is bonded to a support and includes a piezoresistive pattern etched on one face of a flexible film. A layer of a material subject to relaxation is deposited on the other face of the film. The relaxation layer is bonded to a test piece of the same material as the support. A constant force is applied for producing a creep on the test piece and the resistance of gauge as a function of time is measured. The thickness of the relaxation layer is adjusted to cancel out the evolution of the resistance of the gauge.

5 Claims, 1 Drawing Sheet

REGULATABLE CREEP STRAIN GAUGES AND PROCESS FOR OBTAINING SUCH GAUGES

The present relates to a process for obtaining strain gauges making it possible to compensate for creep of a support to which they are to be bonded or adhered. It also relates to the gauges obtained by this process and more particularly the gauges for metal test materials.

The elasticity of materials is not perfect. In particular, it is found that the application of a stress or load for a long period leads to a progressive increase in the deformation of bodies subject thereto. This phenamenon is called creep. When strain gauges are installed on these bodies, they consequently undergo a supplementary elongation, so that there is an evolution in their readings.

For certain applications where the creep is of great interest, it is obviously desirable to be able to record this evolution. However, particularly in the case where the support subject to the creep is a deformable part of a force or pressure transducer, said evolution is harmful because the measurements can no longer be true. In the case of weighing machines where the objects to be weighed are progressively brought together, the measuring time can be a few minutes or even several dozen minutes and the variations in the transducer readings can be several per cent. An identical problem occurs with pressure transducers, which continuously monitor the evolution of the pressure of a liquid in a pipe.

The invention makes it possible to eliminate the undesirable influence of the creep of the support material on the piezoresistive pattern of a strain gauge by interposing between them a layer of a material subject to relaxation or stress relief.

More specifically, the invention relates to a process for obtaining strain gauges making it possible to compensate for creep of a support to which they are to be bonded, the gauges having a piezoresistive pattern etched on one face of a flexible film, characterized in that it comprises the following stages:
deposition of a layer of a material subject to relaxation on the other face of the film,
bonding of the relaxation layer to a testpiece of the same material as the support,
application of a constant force producing a creep on the testpiece, measuring the evolution of the resistance of the gauge as a function of time, and
deduction of the thickness of the relaxation layer in order to cancel out the evolution of the resistance of the gauge.

Two preferred embodiments relate to a strain gauge not sensitive to the creep of a steel or aluminum support to which it is to be bonded, comprising a piezoresistive pattern etched on one face of a flexible film and which are characterized in that there is a Constantan layer with a thickness between 100 and 200 nm, one face of which is to be bonded to the support and which is fixed by its other face to the other face of the flexible film or respectively a chrome-nickel alloy layer with weight proportions of 20 and 80% and a thickness between 80 and 100 nm. In their most general form, the gauges according to the invention comprise a layer subject to relaxation, one face is bonded to a support subject to creep. The material of said layer is advantageously metallic and preferably identical to that of the resistant pattern.

The invention is now described in greater detail relative to non-limitative embodiments and the attached drawings, wherein FIg. 1 is a perspective view of a strain gauge according to the invention at the time when it is used or tested.

Figure 2:
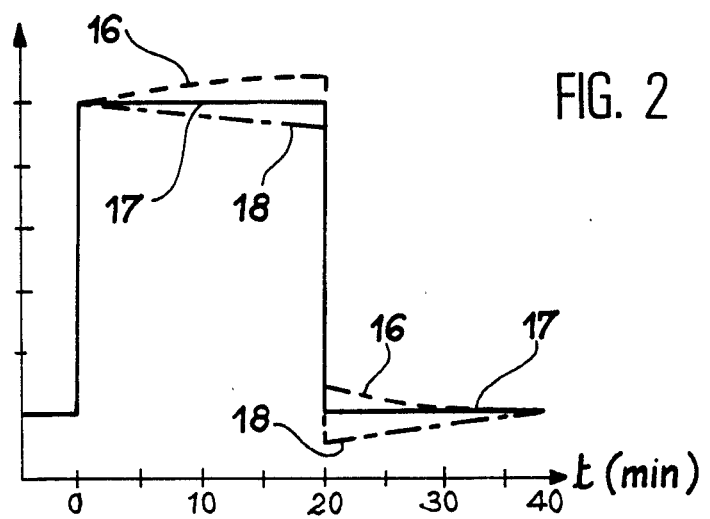

FIG. 2 is a graphical depction of the performance of a typical test with different strain gauges, on a support subject to creep.

As can be seen in FIG. 1, the gauge according to the invention comprises parts already used in the prior art. There is firstly a flexible film 1, which can be 25 $\mu$m thick polyimide and on whose upper face 2 is deposited a fine approximately 0.15 $\mu$m thick conductive material coating 3 which is then etched so as to only leave a piezo-resistive pattern 4 having parallel strands 5 interconnected by loops 6, so as to form a single conductive path between two terminals 7. The deposition of this limited thickness can be effected e.g. by cathodic sputtering or evaporation, which is fast, simple and perfectly suitable for large scale production. The piezoresistive pattern 4 then completely adheres to the flexible film 1 whose deformations it follows. The invention can also be applied to thicker piezoresistive patterns (5 $\mu$m) produced following the bonding of the conductive material layer to the flexible film. The recommended numerical values in the following example can be adjusted because the adhesion achieved by bonding is not perfect and the piezoresistive pattern can itself deform under the effect of prolonged stressing.

As is known, the elongation or contraction of the strands 5 is used for measuring the deformations of the support to which the gauge is bonded. It is obvious that in FIG. 1 the thicknesses have been considerable exaggerated to enhance clarity.

According to the invention, on the lower face 8 of the flexible film 1 is deposited a layer 9 subject to relaxation. The upper face 10 of layer 9 is welded to the lower face 8 of film 1 and the lower face 11 of layer 9 is bonded to a support 12 subject to creep by means of a glue coating 13.

When the support 12 is subject to a mechanical stress of constant amplitude and relatively long duration, the possible readings of the gauges are shown in FIG. 2. On this graphical representation, on the abscissa is plotted the time in minutes and on the ordinate the values recorded by the gauges. In this example, the mechanical stress was applied at the time origin and removed 20 minutes later. Curve 16 represents the readings of a conventional gauge not having a layer 9 subject to relaxation and curves 17, 18 represent the readings of gauges having a layer 9 subject to relaxation, but of different thicknesses. The conventional gauges record the creep of support 12 and supply ever increasing values when the mechanical stressing is prolonged. This increase is substantially linear. On releasing support 12, it is found that the material does not immediately return to its initial, undeformed state, because the part the deformation due to creep is only resorbed at a speed substantially equal to that of creep, a residual deformation remaining for a futher 20 minutes.

Consequently both during stressing and after it, the measurement made by the conventional gauge cannot be considered as true, because it gives readings differing over a period of time.

If layer 9 which is subject to relaxation is relatively thick, response curves of the type represented by 18 are obtained. The magnitude of the readings of the gauge decreases as stressing is continued and on releasing support 12, the readjustment to zero is progressive and during this time readings are recorded of opposite sign to those recorded during stressing. The layer 9 subject to relaxation progressively shears at a speed higher than the creep speed, so that the piezoresistive pattern 4 is subject to ever smaller deformations. Following the removal of the stress, the relaxation temporarily remains and subjects the piezoresistive pattern to deformations of opposite sign, which only disappear after a reverse relaxation of layer 9. A gauge according to the invention essentially has the response curve 17. The readings given by the gauge remain constant when stressing is prolonged and immediately return to zero when the support 12 is released. Thus, the readings of said gauge are not dependent on time.

Curve 17 is obtained by a careful choice of the thickness of layer 9 subject to relaxation, an inadequate thickness giving a curve 16 and an excessive thickness giving a curve 18. This thickness can be experimentally determined as a function of the creep properties of the material of support 12 and the relaxation properties of the material of layer 9, when choosing the thickness of layer 9 deposited on the lower face 8 of the flexible film 1. The gauge is then bonded to a test support of random shape and dimensions, but of the sam material as that for which the gauge was intended and the test support undergoes constant stressing for an adequate time. As a function of the results obtained, the thickness of layer 9 subject to relaxation is adjusted.

Several experiments were carried out in this way. It was found that in the case of steel supports, it is advantageous to use a Constantan layer of thickness between 100 and 200 nm and preferably close to 160 nm. For the latter value, the gauge is completely insensitive to the creep of the support 12 and for extreme values, the variations of the readings due to the creep are only 40% of the variations which would be obtained in the absence of the Constantan layer. For aluminum supports, the layer 9 being of a chrome-nickel alloy with respective proportions 20 and 80% by weight, the range corresponding to the same percentage variation of the readings is approximately 67 and 105 nm. The value for which the gauge is completely insensitive to creep is approximately 90 nm.

Obviously the invention is not limited to these specific examples, but instead covers all gauges obtained with the aid of the process according to the invention. In particular, the materials of support 12 and layer 9 subject to relaxation can be of a random nature and can be matched in a random manner. It is advantageous for simplifying production and possibly economizing a deposition stage by carrying out deposition on both faces at once, for layer 9 to have the same composition as the piezoresistive pattern 4. Support 12 can be crooked, e.g. cylindrical.

Although layer 9 is often conductive, no prejudicial effect occurs on the electrical measurements through impedance losses because the flexible film 1 provides an adequate insulation.

What is claimed is:

1. A strain gauge for bonding on a metallic support subject to creep, comprised of a flexible film having an upper face and a lower face, a piezoresistive pattern adhering to the upper face of the flexible film and a layer having an upper face and a lower face, the upper face of the layer adhering to the lower face of the flexible film, and the lower face of the layer being adapted to be bonded on the metallic support, wherein the layer is made of material capable of relaxation and has a thickness between its lower and upper faces which substantially eliminates the influence of the creep of the metallic support on the gauge reading.

2. The strain gauge according to claim 1, wherein the material capable of relaxation is metallic.

3. The strain gauge according to claim 2, wherein the support is made of steel, and the material capable of relaxation is made of Constantan and has a thickness between 100 and 200 nm.

4. The strain gauge according to claim 2, wherein the support is made of aluminum, and the material capable of relaxation is made of chrome-nickel alloy in weight proportions of 20 and 80% and has a thickness between 67 and 105 nm.

5. The strain gauge according to claim 2, wherein the piezoresistive pattern and the material capable of relaxation have the same composition.

* * * * *